Patented July 20, 1954

2,684,375

UNITED STATES PATENT OFFICE 2,684,375

PROCESS FOR THE BROMINATION OF STEROIDS

Eugene P. Oliveto, Long Island City, N. Y., and Corinne E. Gerold, Lyndhurst, N. J., assignors to Schering Corporation, Bloomfield, N. J., a corporation of New Jersey No Drawing. Application May 13, 1952, Serial No. 287,612

25 Claims. (Cl. 260—397.1)

Our invention relates to the bromination of steroids, and especially to steroids employed in the synthesis of steroid hormones of various kinds.

It is the general object of the invention to provide a process for the bromination of steroids, whereby bromination may be effected both rapidly and with a minimum of side reactions.

It is a further object of the invention to provide a process for the bromination of steroids wherein high yields are obtained, without the necessity for observing any special or critical conditions for the bromination reaction.

A still further object of the invention is to provide an improved process for the bromination of keto-steroids wherein the reaction is limited to the introduction of bromine into the nucleus and without modification of reactive groups attached to the nucleus.

It is known that hydrogen bromide must be present for the bromination of keto-steroids to proceed at a reasonable rate. As the reaction proceeds, more hydrogen bromide is generated, and the rate of the reaction increases to a certain maximum. The solvents which are used in these bromination reactions must be unreactive towards both bromine and hydrogen bromide. The two most commonly used solvents are acetic acid and chloroform.

The generation of hydrogen bromide in the bromination reaction, while it may accelerate the rate of the reaction, is disadvantageous in that the hydrogen bromide may cause deep-seated changes in the rest of the steroid molecule, especially when sensitive groups are present in the side chain, as for example in cortisone syntheses, where it is desired to brominate a 3-ketone in the 2- or 4-position. It is also known that hydrogen bromide will cause disproportionation of steroid bromo-ketones, thus further increasing the complexity of the reaction mixture, with the resulting loss in yield of the desired bromide.

In order to cut down these secondary reactions, previous investigators [ e. g., Mattox and Kendall, J. Biol. Chem., 185, 593 (1950)] have sought to limit sharply the concentration of HBr in the reaction mixture, usually by the addition of sodium acetate or similar base. This technique has necessitated the use of carefully standardized reagents, such as standard hydrogen bromide in acetic acid, and bromine in acetic acid, and the sodium acetate must be accurately weighed. These precautions must be strictly observed, otherwise the concentration of HBr will either become too high (as, for example, by the addition of too much HBr in acetic acid) or too low (as, for example, by the addition of too much sodium acetate). If the concentration is too high, the side reactions will take place, and if the concentration is too low, the bromination will either be too slow or not take place at all.

If the necessary precautions are not observed, the reaction will be very slow, or the yield will be poor, or both of these results will occur. Thus, by a sudden addition of the bromine-sodium acetate reagent, all of the free hydrogen bromide may be suddenly removed from the reaction zone, thereby more or less completely quenching the reaction.

We have found that by the use of a mixture of two solvents as the reaction medium, one of which solvents, in contrast to the solvents heretofore employed, appears to react with the hydrohalic acid, while the other is inert, all of the above mentioned difficulties in the bromination of keto-steroids can be eliminated. The relatively reactive solvent is a tertiary alcohol, which in the course of the reaction appears to bind the hydrohalic acid, but either leaves enough hydrohalic acid free, or releases a sufficient proportion thereof to allow the reaction to proceed at a rapid rate, but not enough to cause side reactions to an appreciable degree. The tertiary alcohol is preferably liquid at room temperature and miscible with the second solvent. It is preferably miscible also, at least to some degree, with water, so that upon evaporation of the other solvent, the brominated keto-steroid can be precipitated from its solution in the tertiary alcohol by the simple addition of water.

While we prefer to employ hydrobromic acid as the catalyzing acid, our process is not restricted thereto, as other strong acids can be employed, such as hydrochloric, sulfuric and the like which are non-oxidizing under the conditions of the reaction.

Aliphatic tertiary alcohols have been found by us to have the required combination of properties, and in particular, t-butyl alcohol, t-amyl alcohol, and methyl cyclohexanol. Of these, t-butyl alcohol is preferred, because it is a cheap and readily available solvent of high purity, thus being suitable to large-scale operations, and is miscible with water. However, although they are generally more expensive, aromatic tertiary alcohols can be used in place of the tertiary aliphatic alcohols, examples of such aromatic tertiary alcohols being dialkyl phenyl (or benzyl) carbinols and alkyl diphenyl (or dibenzyl) carbinols, like methyl ethyl phenyl carbinol, methyl diphenyl carbinol, and diethyl benzyl carbinol. The tertiary alcohol aparently acts as a base and ties up the hydrohalic or other acid, but as already indicated, leaves a sufficient amount of the acid free to catalyze the bromination and thereby speed up the reaction. If desired, a mixture of tertiary alcohols can be employed.

The second solvent should be a good solvent for the steroid being brominated and must be inert toward the reagents employed; i. e., it must not react with the bromine or hydrogen bromide. If it is easily removable from the reaction mixture when it is not miscible with water, which will generally be the case, it will not interfere with the precipitation of the brominated product by the addition of water. This second, inert solvent is preferably, although not necessarily, more volatile than the tertiary alcohol, so that it can be removed by evaporation, with or without the aid of vacuum. Suitable solvents of this type are methylene chloride, chloroform and other halogenated hydrocarbons, ethers, esters, aliphatic and aromatic hydrocarbons, like hexane and benzene, and other known solvents for keto-steroids which are non-reactive toward the reagents employed in the process but are miscible with the tertiary alcohol employed.

The starting compounds can have a keto group at various points in the nucleus, and can have a keto group also in a side chain. While the reaction is preferably conducted with saturated steroids, it is not necessarily restricted thereto, as any double bond which has been saturated by the addition of bromine, can be subsequently restored by the elimination of bromine in known manner. The reaction is unaffected by the presence or absence of side chains, or by the nature of the side chains. Thus, the starting compounds can include ketones, keto-alcohols, keto-acids and keto-esters of the androstane, pregnane and cholane series, the side chain degradation products of the cholane series, and the more complex steroids like the sapogenins and pseudo-sapogenins.

Where the starting compound to be brominated contains a hydroxyl group or other group reactive toward bromine, such group can be protected in known manner and subsequently regenerated. Thus hydroxyl groups can be esterified or etherified, as by being converted into acetoxy, propionoxy, benzoyloxy, methoxy, ethoxy, benzyloxy, etc. groups.

The invention will be further described in greater detail in the following examples which are presented for purposes of illustration only and not as indicating the limits of the invention:

*Example I*

To a solution of 1.00 g. of dihydrocortisone acetate (pregnan-17α,21-diol-3,11,20-trione-21-acetate) in 10 ml. of methylene chloride previously saturated with HBr and 10 ml. of t-butanol was added a solution of 0.40 g. of bromine in 5 ml. of methylene chloride and 5 ml. of t-butanol over a period of 10 minutes. All the bromine color was discharged at the end of this time. The methylene chloride was removed by distilling under reduced pressure. When crystallization began, the residual solution was poured into 200 ml. of cold water. The precipitate was filtered off, washed with water, and dried at 50° C. The yield of crude 4-bromo-dihydrocortisone was quantitative. Recrystallization from aqueous acetone gives pure material, $[\alpha]_D^{25} +102°$ (1% in acetone).

*Example II*

Example I was repeated, except that there was no added hydrogen bromide. One and one-half to two hours were required for the bromine color to discharge. The reaction mixture was worked up as in Example I to yield 4-bromo-dihydrocortisone.

*Example III*

Repetition of Example I with no added hydrogen bromide but with added benzoyl peroxide, required 4 hours for complete reaction. Work-up as usual gave 4-bromo-dihydrocortisone.

*Example IV*

The bromination of 1 g. pregnan-11β,17α,21-triol-3,20-dione-21-acetate with one equivalent of bromine as in Example I, was complete in 15 minutes. The product isolated was 4-bromo-pregnan-11β,17α,21-triol-3,20-dione-21-acetate.

*Example V*

1 g. of 3-acetoxy-12-ketochloanic acid which was dissolved in 10 ml. of methylene chloride saturated with HBr and mixed with 10 ml. of t-butanol, was treated with one equivalent of bromine in 5 ml. of methylene chloride and 5 ml. of t-butanol, over a period of about 10 minutes. Upon evaporation of the methylene chloride and addition of water, there was precipitated 3-acetoxy-11-bromo-12-ketocholanic acid.

*Example VI*

Bromination of androstan-3,17-dione with 2 equivalents of bromine, under the conditions and with the reagents and solvents of Example I, gave a good yield of 2,2-dibromoandrostandione.

*Example VII*

One gram of allopregnan-17α,21-diol-3,11,20-trione-21-acetate was brominated with one equivalent of bromine in the presence of HBr and in the mixture of solvents described in Example I. The product obtained was 2-bromo-allopregnan-17α,21-diol-3,11,20-trione - 21 - acetate.

While the use of bromine is preferred, it will be understood that other halogens, particularly chlorine and also iodine, can be used under similar conditions to produce the corresponding halides.

We claim:

1. Process for the bromination of nuclear keto-steroids which comprises reacting a 10,13-dimethyl steroid having a keto group in one of the 3- and 12-positions and a nuclear methylene adjoining such keto group, with bromine in the presence of a strong mineral acid and a solvent medium comprising a tertiary alcohol together with an inert solvent for the keto-steroid which is miscible with the tertiary alcohol.

2. Process according to claim 1, wherein the acid is hydrobromic acid.

3. Process according to claim 1, wherein the inert solvent is more volatile than the tertiary alcohol.

4. Process according to claim 1, wherein the inert solvent is methylene chloride.

5. Process according to claim 1, wherein the inert solvent is chloroform.

6. Process according to claim 1, wherein the tertiary alcohol is aliphatic and is liquid at room temperature.

7. Process according to claim 1, wherein the tertiary alcohol is t-butyl alcohol.

8. Process according to claim 1, wherein the tertiary alcohol is t-amyl alcohol.

9. Process for the bromination of nuclear keto-steroids which comprises reacting a 10,13-dimethyl steroid having a keto group in one of the 3- and 12-positions and a nuclear methylene adjoining such keto group, with bromine in the presence of hydrobromic acid and in a solvent medium comprising a tertiary aliphatic alcohol together with a mutually miscible inert solvent for the keto-steroid.

10. Process according to claim 9, wherein the inert solvent is more volatile than the tertiary alcohol, and including the step of evaporating the inert solvent after bromination and adding water to the reaction mixture to precipitate the brominated keto-steroid.

11. Process according to claim 9, wherein the inert solvent is methylene chloride.

12. Process according to claim 9, wherein the inert solvent is chloroform.

13. Process according to claim 9, wherein the alcohol is t-butyl alcohol.

14. Process according to claim 9, wherein the alcohol is t-amyl alcohol.

15. Process according to claim 9, wherein the steroid is a 3-keto androstane compound.

16. Process according to claim 9, wherein the starting compound is a 3-keto pregnane compound.

17. Process according to claim 9, wherein the starting compound is a 3-keto-21-acyloxy pregnane.

18. Process according to claim 9, wherein the starting compound is a 12-keto steroid.

19. Process according to claim 9, wherein the starting compound is a 12-keto-cholane compound.

20. Process for the bromination of nuclear keto-steroids having replaceable hydrogen on a carbon atom adjoining the keto group, which comprises reacting androstan-3,17-dione with bromine in the presence of hydrobromic acid and in a solvent medium comprising a tertiary aliphatic alcohol together with a mutually miscible inert solvent for the keto-steroid.

21. Process for the bromination of nuclear keto-steroids having replaceable hydrogen on a carbon atom adjoining the keto group, which comprises reacting pregnan-11$\beta$,17$\alpha$,21-triol-3,20-dione-21-acetate, with bromine in the presence of hydrobromic acid and in a solvent medium comprising a tertiary aliphatic alcohol together with a mutually miscible inert solvent for the keto-steroid.

22. Process for the bromination of nuclear keto-steroids having replaceable hydrogen on a carbon atom adjoining the keto group, which comprises reacting 3-acetoxy-12-ketocholanic acid with bromine in the presence of hydrobromic acid and in a solvent medium comprising a tertiary aliphatic alcohol together with a mutually miscible inert solvent for the keto-steroid.

23. Process for the bromination of nuclear keto-steroids having replaceable hydrogen on a carbon atom adjoining the keto group, which comprises reacting allopregnan-17$\alpha$,21-diol-3,11,20-trione-21-acetate with bromine in the presence of hydrobromic acid and in a solvent medium comprising a tertiary aliphatic alcohol together with a mutually miscible inert solvent for the keto-steroid.

24. Process for the bromination of nuclear keto-steroids having replaceable hydrogen on a carbon atom adjoining the keto group, which comprises reacting pregnan-17$\alpha$,21-diol-3,11,20-trione-21-acetate with bromine in the presence of hydrobromic acid and in a solvent medium comprising a tertiary aliphatic alcohol together with a mutually miscible inert solvent for the keto-steroid.

25. Process for the bromination of nuclear keto-steroids having replaceable hydrogen on a carbon atom adjoining the keto group, which comprises reacting pregnan-17$\alpha$,21-diol-3,11,20-trione with bromine after protecting the 21-hydroxyl against the action of the bromine in the presence of hydrobromic acid and in a solvent medium comprising a tertiary aliphatic alcohol together with a mutually miscible inert solvent for the keto-steroid.

References Cited in the file of this patent

FOREIGN PATENTS

| Number | Country | Date |
| --- | --- | --- |
| 466,026 | Canada | June 20, 1950 |